May 15, 1945.  C. E. HEMMINGER  2,376,139
CHEMICAL PROCESS
Filed April 26, 1941
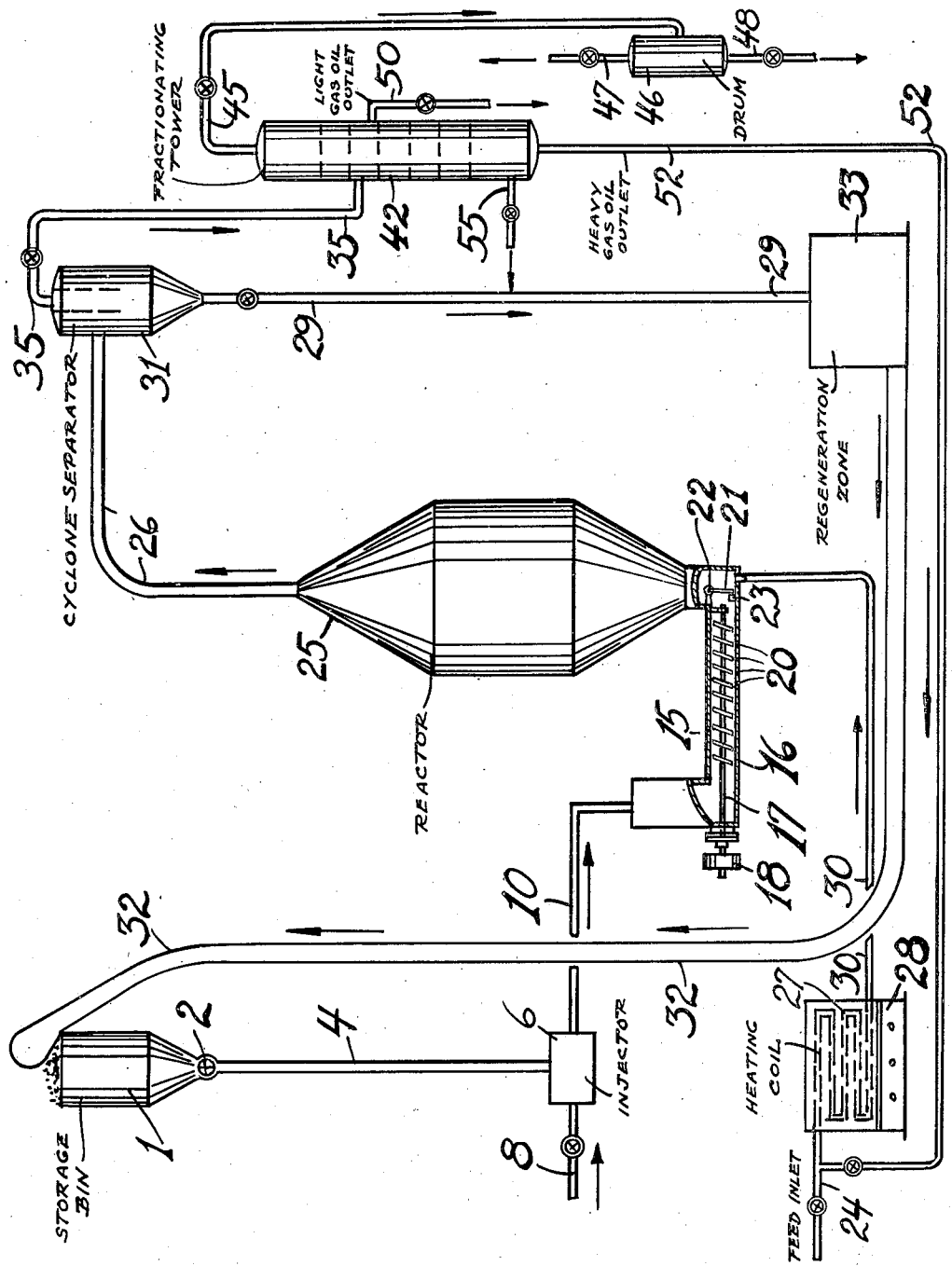

Patented May 15, 1945

2,376,139

UNITED STATES PATENT OFFICE 2,376,139

CHEMICAL PROCESS

Charles E. Hemminger, Westfield, N. J., assignor to Standard Oil Development Company, a corporation of Delaware Application April 26, 1941, Serial No. 390,472

2 Claims. (Cl. 196—52)

The present invention relates to improvements in the art of feeding a solid material, and more particularly it relates to feeding a powdered material, such as acid treated clay, into an environment where it contacts a reactable vapor, such as a hydrocarbon oil vapor.

In recent years, a considerable amount of research has been directed towards developing a continuous process for cracking a hydrocarbon oil, such as a gas oil, in the vapor phase to produce a gasoline of improved octane rating. In some of this research, a catalyst in divided form, such as an acid treated clay in the form of powder, was mixed with hydrocarbon oils heated to cracking temperatures, and the catalyst was permitted to remain in contact with the heated oil for a sufficient period of time to effect the desired conversion, whereupon the catalyst was separated from the reaction products, regenerated and reused.

One of the problems of effecting a mixture of subdivided solid catalyst material was that with acid treated clays the powdered or subdivided catalyst tended to form balls or lumps, particularly in the case where the catalyst was discharged into the reaction zone by means of a compression pump during which operation the bulk density of the catalyst was increased during compression. Of course the formation of balls or lumps of powdered catalyst greatly reduces the catalytic activity, makes concurrent upward flow of catalyst and reaction vapors through a reaction zone difficult, which type of flow offers many advantages, and otherwise presents a number of problems.

In its broadest aspect, the object of the present invention relates to an apparatus and a process for continuously discharging a subdivided solid material into a gaseous environment under conditions such that the solid material is not formed into lumps or balls by the operation of so feeding it.

A more specific object of the present invention is to provide a process and suitable means for discharging a powdered acid treated clay catalyst into a reactable vapor in such a manner that the substantially uniform particle size and the activity of the catalyst so fed will be maintained during the feeding operation.

Other and further objects of my invention will appear from the following description and claims.

The present invention will be best understood by reference to the accompanying drawing showing diagrammatically and in partial vertical section a form and arrangement of apparatus elements in which my improvements may be carried into effect.

Referring in detail to the drawing, a powdered material, such as an acid treated clay having a particle size of from 200 to 400 mesh, is withdrawn from storage bin 1 through a star feeder 2 and conduit 4 into an injector 6. Steam, $CO_2$, or some such gas is withdrawn from some source through line 8 and also discharged into injector 6. In injector 6 the powdered material is "fluidized" by the gas, i. e., intermixed therewith and rendered more fluid or flowable, and thereafter withdrawn through line 10. The mixture of catalyst and gas hereafter sometimes referred to as a suspension has a density of about 5 to 50 lbs. per cubic foot, depending on the type of material used. The material in line 10 in the case, let us say, where it eventually is to be used in a gas oil cracking operation, is then passed into a bladed multiple stage fan 15 consisting essentially of a casing 16, a driven shaft 17 carrying a securely mounted pulley 18 on a projection of said shaft, as shown. A suitable driving means such as a motor (not shown) may be used to drive pulley 18. Integrally mounted on shaft 17 are a plurality of fan elements 20, and it will be noted from the drawing that these fan elements are of such diameter as to afford a clearance between their outer edges and the inner surface of casing 16. This clearance may amount to as much as from .01 to 0.1 inch. The material fed into the fan 15 is pumped therethrough by a rotation of shaft 17, and the fan elements 20 integral with the rotatable shaft 17 whose rotation is sufficiently rapid to prevent a large pressure drop across the length of casing of the pump or fan, and preferably the rotation should be from about 750 to 3750 revolutions per minute when the density of the material discharged to the pump is from 5 to 50 lbs. per cubic foot.

To prevent blow back through the pump due to any emergency, a check valve is placed at the discharge end of the pump barrel. The plate 21 of the check valve is suspended from pivot 22 and in closed position rests against seat 23. A variable space exists between the end of the shaft 17 and of barrel 15 to assist in sealing the pump against back pressure. The greater the pressure increase caused by the pump, the greater is the distance from the front end of 17 to the front or discharge end of 15.

In the case where clay is to serve as a catalyst in a cracking operation, the material discharges into a point at near the bottom of a reactor 25 where it becomes thoroughly intermixed with hydrocarbon oil vapor, as will presently appear.

In the illustration given, an East Texas gas oil having say an A. P. I. gravity of 18° is introduced into the system through line 24 and thence discharged into a coil 27 disposed in a furnace 28 where the oil is heated to cracking temperatures, say a temperature of from 825° F. to 975° F., with a temperature of about 850° F. being preferred. The heated oil is withdrawn from the furnace through line 30 and discharged into the bottom of reactor 25. In reactor 25 the catalyst and the heated hydrocarbon vapors undergo thorough mixing, and the mixture flows upwardly in the reactor, whereupon gas oil is converted, in part at least, to hydrocarbons boiling within the gasoline range. Usually the gas oil remains resident in the reaction zone for a period of from 5 to 50 seconds or longer, depending on the nature of the stock. The gaseous products and the catalyst are withdrawn from the reactor 25 through line 26 and discharged into a cyclone separator 31, the cyclone separator serving to separate the clay from the cracked vapors. The clay is withdrawn from cyclone separator 31 through line 29, regenerated usually by combustion in the presence of air in a system represented diagrammatically by 33 and then recycled by any convenient conveying means such as a Redler conveyor 32 to hopper 1 for reuse in the process.

The gaseous products are withdrawn from the cyclone separator 31 through line 35, to a fractionating column 42 for separation of the products into desired constituents. In this latter connection normally gaseous hydrocarbons and gasoline may be withdrawn from fractionating column 42 through line 45 and delivered to a separation drum 46 from which separation drum normally gaseous hydrocarbons may be withdrawn through line 47 and delivered to equipment suitable to recover the $C_1$, $C_2$, $C_3$ and possibly $C_4$ hydrocarbons, individually or mixtures thereof usually contained therein, while gasoline is recovered from the bottom of the drum through line 48.

A light gas oil may be recovered from the fractionating column 42 through line 50, and a heavier gas oil may be recovered through line 52 and recycled to line 1 for further treatment in the process to recover additional quantities of gasoline. Highly refractory oil not desired to be recirculated may be withdrawn from the tower 42 through line 55, and this oil may be refined, if desired, to form a domestic heating fuel.

It is to be understood that instead of using a single cyclone separator to separate the fouled catalyst from the gaseous constituents, two or more cyclone separators may be used in series and, if desired, a Cottrell precipitator may be used to remove the last traces of catalyst from the constituents before they are fractionated.

In the illustration given, it will be understood that the same is merely illustrative of a specific application of my invention to an oil cracking process and that my improvements are not limited to any particular process, but rather include any operation in which it is desired to feed a powdered material into an environment without causing ball or lump formation in the feeding mechanism; thus, for example, my improvements include operations where it may be desired to oxidize, chloridize, reduce or otherwise effect an endothermic or exothermic reaction of the gaseous material in the presence of a sub-divided solid material where one of the problems is to maintain the solid material in the reaction zone in divided condition and to eliminate the formation of balls or lumps as a result of the process of feeding solid material to the reaction zone. Thus, experience has shown that if the powdered material were an acid treated clay fed by means of a compression pump directly into a reaction chamber, such as 25 as shown in the accompanying drawing, that a number of difficulties would arise, the most serious of which would be the formation of balls or lumps caused by the action of the screw. It is therefore the main purpose of my invention to feed continuously into a gaseous environment a powdered material without causing the formation of the aforesaid lumps or balls of such material.

When feeding an acid treated clay to a catalytic cracking process, I have found that the pressure increase to which the material is subjected is limited. This limitation, as already discussed, is a function of the initial and final density of the suspension. If a suspension of 15 lbs. per cubic foot is fed and the free settling bulk density is 50 lbs. per cubic foot, the maximum compression is roughly limited to one to three times the original density, say from 15 lbs. per square inch to 30 to 45 lbs. per square inch in absolute pressure so that the final mixture does not exceed greatly the free settling density of the mixture. Otherwise, the particles are forced together with such pressure that interspersed gas is compressed and agglomeration results. In a specific case, "Superfiltrol" clay of a size such that 90% passed through 200 mesh, was fed to a compression pump. The initial density was about 25 lbs. per cubic foot at about 5 lbs. per square inch applied gauge pressure. When the pump was run at a speed to give 40 lbs. per square inch gauge pressure, agglomeration resulted, but when the pressure was held below 35 lbs. per square inch, the catalyst was not agglomerated. The free settling bulk density was 60 lbs. per cubic foot.

If greater than the aforedescribed allowable pressure increase is desired, it can be obtained by using several pumps in series. In this modification from each pump, suspension gas under the proper pressure is introduced into the discharged material so that at the end of the next pump the density of the mixture does not materially exceed the free settling density of the solid particles in the gas used in the suspension. Of course, in a single pump the allowable pressure rise can be increased by decreasing the density of the feed suspension. In the previous example, a pressure increase to 50 lbs. per square inch was allowable when the initial density was about 15 lbs. per cubic foot.

The multi-bladed fan is only one of several forms of pumps which may be used to increase the pressure of a suspension of powder in a gas stream. Another form is that in which the rotating element takes the form of a screw mounted on a shaft. The same speed of rotation is desirable for the screw as for the multi-bladed fan above mentioned. The amount of pressure increase is controlled in the case of the fan, by the peripheral speed of the fan, the contour and angle of the blades, and their number and, in the case of the screw, by the number of flights per foot, the diameter of the screw, the thickness of the flights, and the seal at the end of the screw casing. These factors are known to engineers skilled in the art and vary for different sizes of pumps, types of material suspended in the gas, quantity of material to be handled, and other factors.

To summarize briefly, the essential principle upon which this invention is based is that where lumps or ball formation is to be avoided in feeding a powder, the bulk density of a suspension of the powder in a gas must not be increased substantially above the free settling density of the powder in the gas by the compression action of a screw conveyor or equivalent device employed to feed the powder to a reaction zone. For instance, if a suspension of solid in a gas having a density of 25 lbs. per cubic foot is compressed, the pressure at any point in the pump should not cause a density substantially greater than 50 lbs. per cubic foot, which we will assume is the free settling density of the material in question. By "free settling density" I mean the density of a powder or other solid material determined by measuring the volume occupied by a given weight of the material in a vessel or container into which it is discharged. The volume measurement is made without shaking or other disturbance except that necessary to discharge the material into the vessel or container.

An additional feature of the invention is that the clearance between the blades or flights and the barrel should not be substantially less than the average particle size of the material in suspension. Close clearance means that abrasion takes place when small particles fall between the blades and the wall. However, by using high peripheral speeds of 2 to 20 ft. per second, particles are thrown by centrifugal action against the walls of the pump and form a seal against back flow of gases by the blades or flights of the rotatable element. This denser phase is pushed forward by the blades or flights and issues from the pump at a higher pressure than at the suction or introduction end.

In many cases it is advantageous to operate the pump or screw in a vertical position. There, the force of gravity accumulates the powder at the bottom of the pump during stoppages and forms a seal. In a horizontal position the powder drops to the bottom of the barrel, in the absence of the centrifugal force, and leaves an open space at the top. The pumps in a vertical position start feeding on start-ups better than horizontal pumps and, consequently, this modification is preferred.

What I claim is:

1. The process of feeding a powdered clay catalyst into a cracking zone containing hydrocarbon vapors preheated to cracking temperatures which comprises withdrawing the powdered catalyst from a source of supply, fluidizing the said clay by intermixing therewith a gaseous material, subjecting the fluidized material to the action of a rotary pump rotating at a peripheral speed greater than 5 feet per second, under conditions such that the density of the material at any time in the pump is less than free settling density of the clay, and thereafter discharging the clay into a zone containing hydrocarbon vapors heated to a cracking temperature.

2. The process set forth in claim 1 in which an agglomeration of the clay is prevented by intermixing with the clay a sufficient amount of gas at sufficient pressure to prevent a substantial elimination of gas between the interfaces of the individual particles forming the clay powder.

CHARLES E. HEMMINGER.